July 23, 1957 R. J. DIPPY 2,800,652

WIRELESS SIGNALLING SYSTEM

Filed March 17, 1944 5 Sheets-Sheet 1

Inventor
Robert James Dippy
By
Loyd Hall Sutton
Attorney

WIRELESS SIGNALLING SYSTEM

Filed March 17, 1944 5 Sheets-Sheet 2

Inventor
Robert James Dippy
BY
Loyd Hall Sutton
Attorney

July 23, 1957 R. J. DIPPY 2,800,652

WIRELESS SIGNALLING SYSTEM

Filed March 17, 1944 5 Sheets-Sheet 3

Inventor
Robert James Dippy
BY
Loyd Hall Sutton
Attorney

WIRELESS SIGNALLING SYSTEM

Inventor
Robert James Dippy
By
Loyd Hall Sutton
Attorney

Inventor
Robert James Dippy
By Loyd Hall Sutton Attorney 2,800,652

WIRELESS SIGNALLING SYSTEM

Robert James Dippy, Malvern Wells, England, assignor to the Minister of Supply in His Majesty's Government of the United Kingdom of Great Britain and Northern Ireland, London, England Application March 17, 1944, Serial No. 527,017

12 Claims. (Cl. 343—103)

Figure 1:
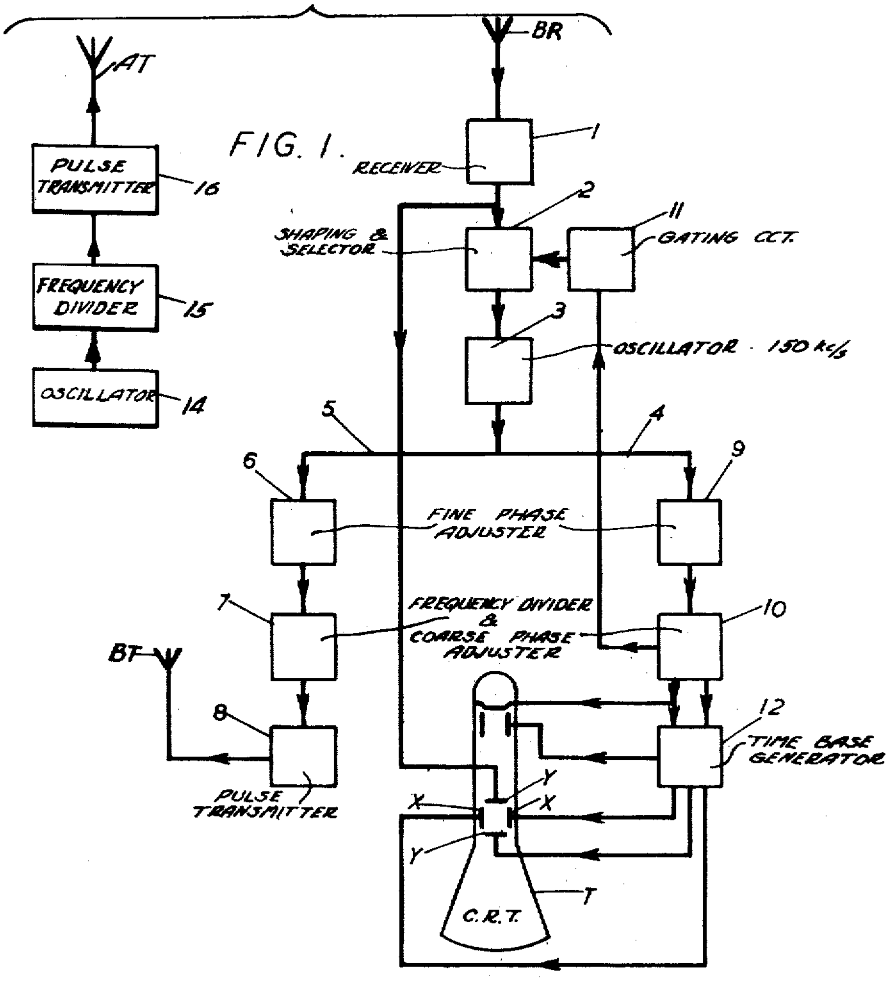

This invention relates to wireless signalling systems in which at least two transmitters are employed to radiate signals which may be used by receiving stations to convey information regarding, for example, the directional bearing or position of such stations in relation to the transmitting stations.

The object of the invention is to provide a transmission system by which useful information may be obtained at one or more receiving stations by observation thereat of the relative timing between the various received signals and without, necessarily, having recourse to known methods of directional reception.

According to one feature of the present invention a wireless transmission system comprising at least two transmitters, each of which in operation radiates a pulse-modulated carrier wave is so arranged that the pulse signals used to modulate the radiation from one of said transmitters are also used at one or more satellite transmitters to maintain a predetermined time-relationship between the pulse-modulations of the first transmitter and counterpart pulse-modulations of the satellite transmitter or transmitters.

According to another feature of the present invention a wireless transmission system for radiating a predetermined space pattern of pulses comprises a main transmitter which is arranged to radiate a succession of short pulses with a constant time-interval between each pulse and at least one further or satellite transmitter which is arranged to radiate counterpart pulse signals to some or all of said main transmitter pulses at a predetermined but controllable time-interval thereafter.

According to a further feature of the invention a wireless transmission system comprises two or more separated transmitters which are co-ordinated to radiate a predetermined space pattern of pulses by means of a master oscillator which directly controls the pulse recurrence frequency of a first or main transmitter and indirectly controls the pulse recurrence frequency of one or more satellite transmitters through circuits which include means for superposing a selected time-interval between the pulses from said main transmitter and the counterpart pulses from each satellite transmitter.

The pulse-modulations of each transmitter preferably take the form of pulses of short time-duration materially less than that of the intervals separating them, the carrier wave being of zero or substantially zero amplitude in the interval between pulses.

The invention is particularly applicable to use in navigational systems employing a predetermined space pattern of pulses such as that described and claimed in my copending application Serial No. 527,018.

In one embodiment of the invention the pulse-modulation of the carrier wave radiated by the first or main transmitter is controlled by a stabilized master oscillator and, preferably, the so controlled pulse-modulations are used at each satellite transmitter to control or lock a further stabilized oscillator operating at the same frequency as that of the main transmitter, this further oscillator in turn controlling the radiation of the counterpart pulse-modulations from the satellite transmitter.

To assist in distinguishing between the various pulse-form signal-modulations radiated by different transmitters one transmitter may radiate, for example, double pulses at selected intervals.

In a particular system embodying the invention, a cathode ray tube is used to provide a visual indication of the relative time spacing of the radiated pulse signals and in order further to facilitate distinguishing between the signals the main time base is divided into vertically spaced horizontal traces in which the signals are caused to appear. Calibration or time-marker pulses are developed and displayed upon the time-base to assist in measuring the timing intervals between the related signals while marking or signal selecting pulses which will be referred to as "strobe" pulses and associated high-speed time bases are also developed to assist in making accurate measurement of the said timing intervals.

Figure 4:
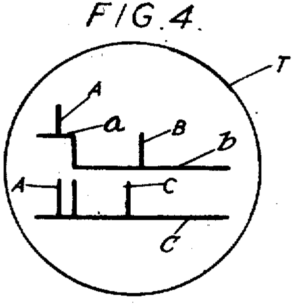
Figure 2:
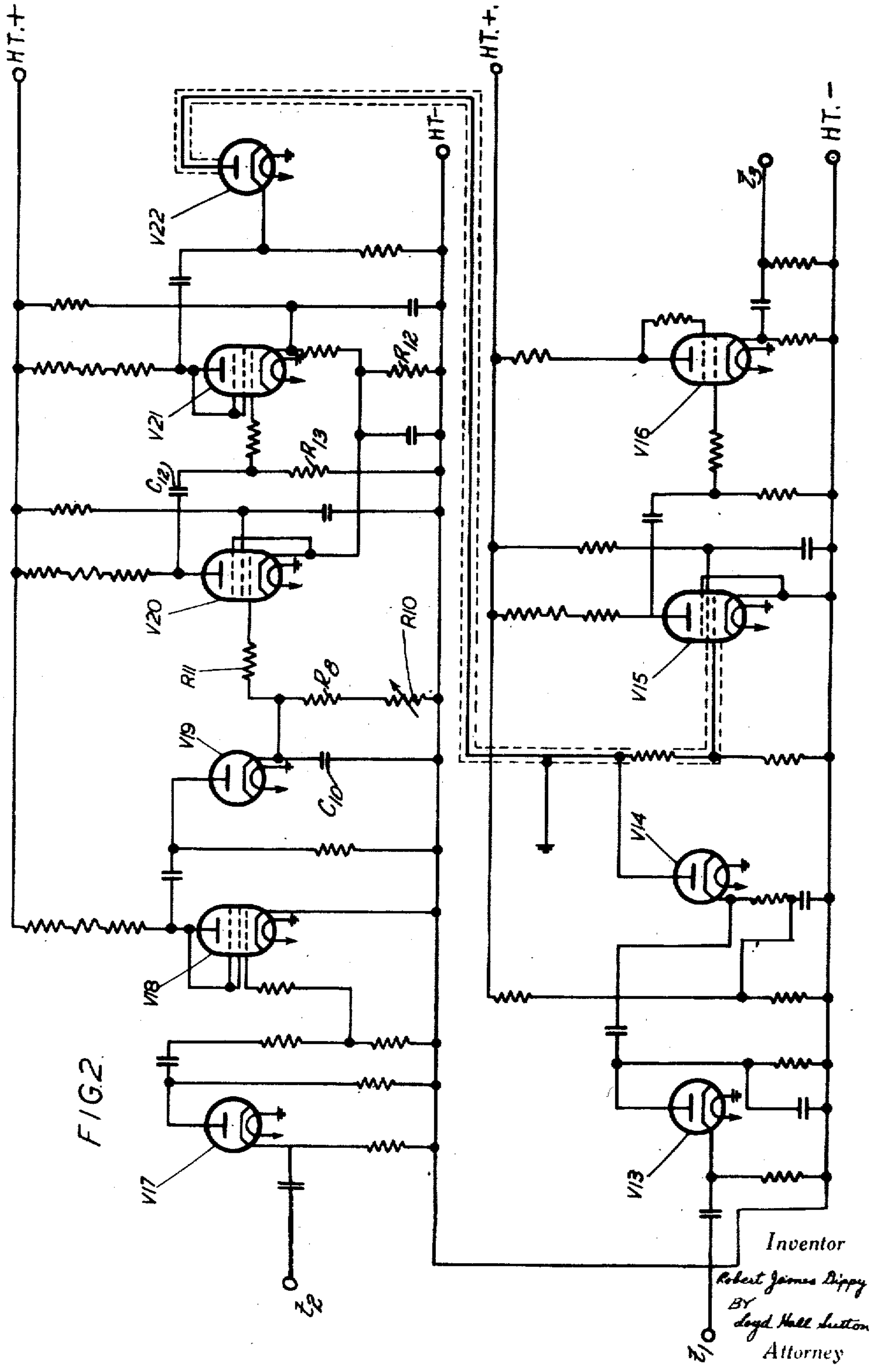
Figure 3:
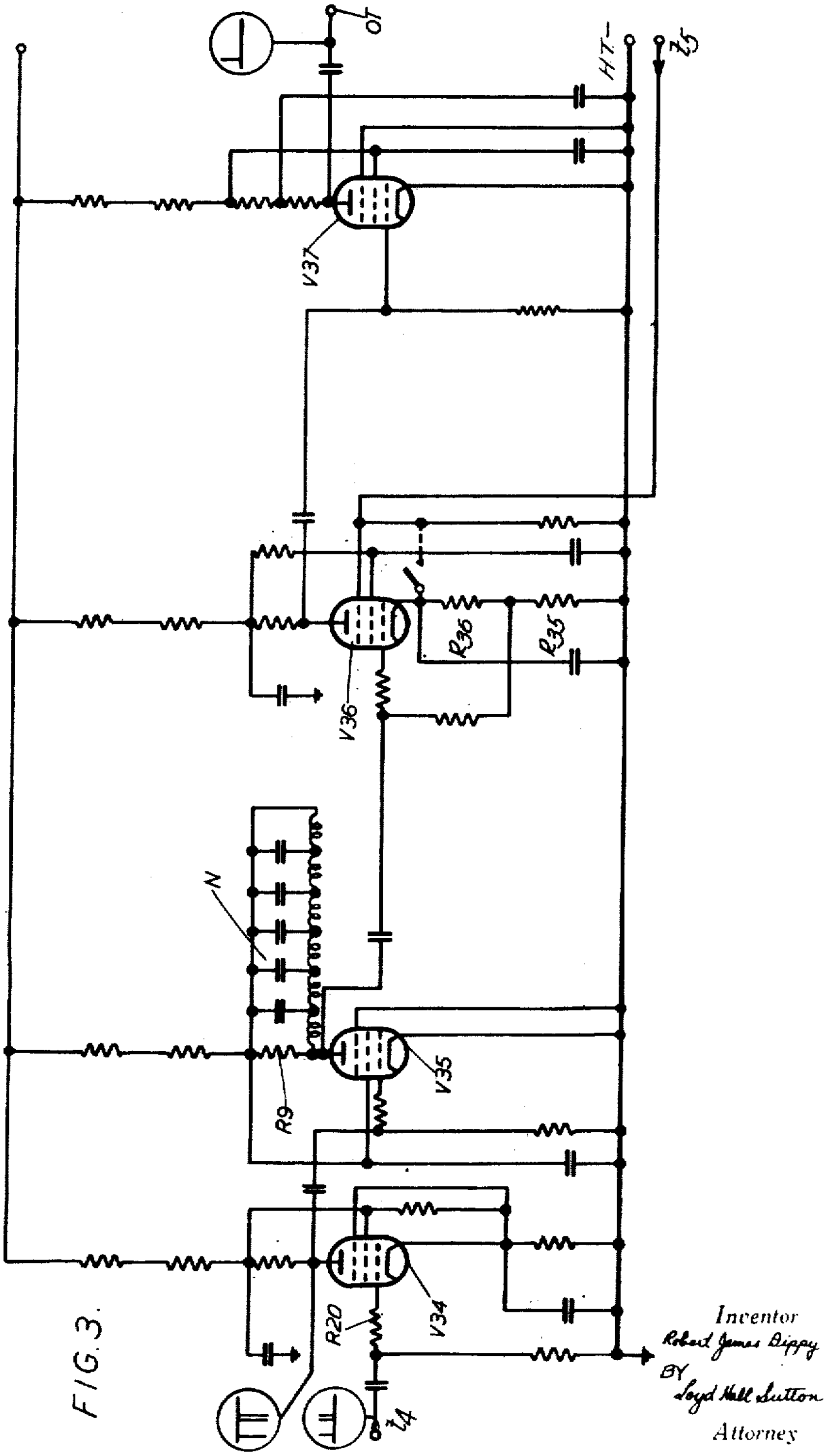
Figure 4A:
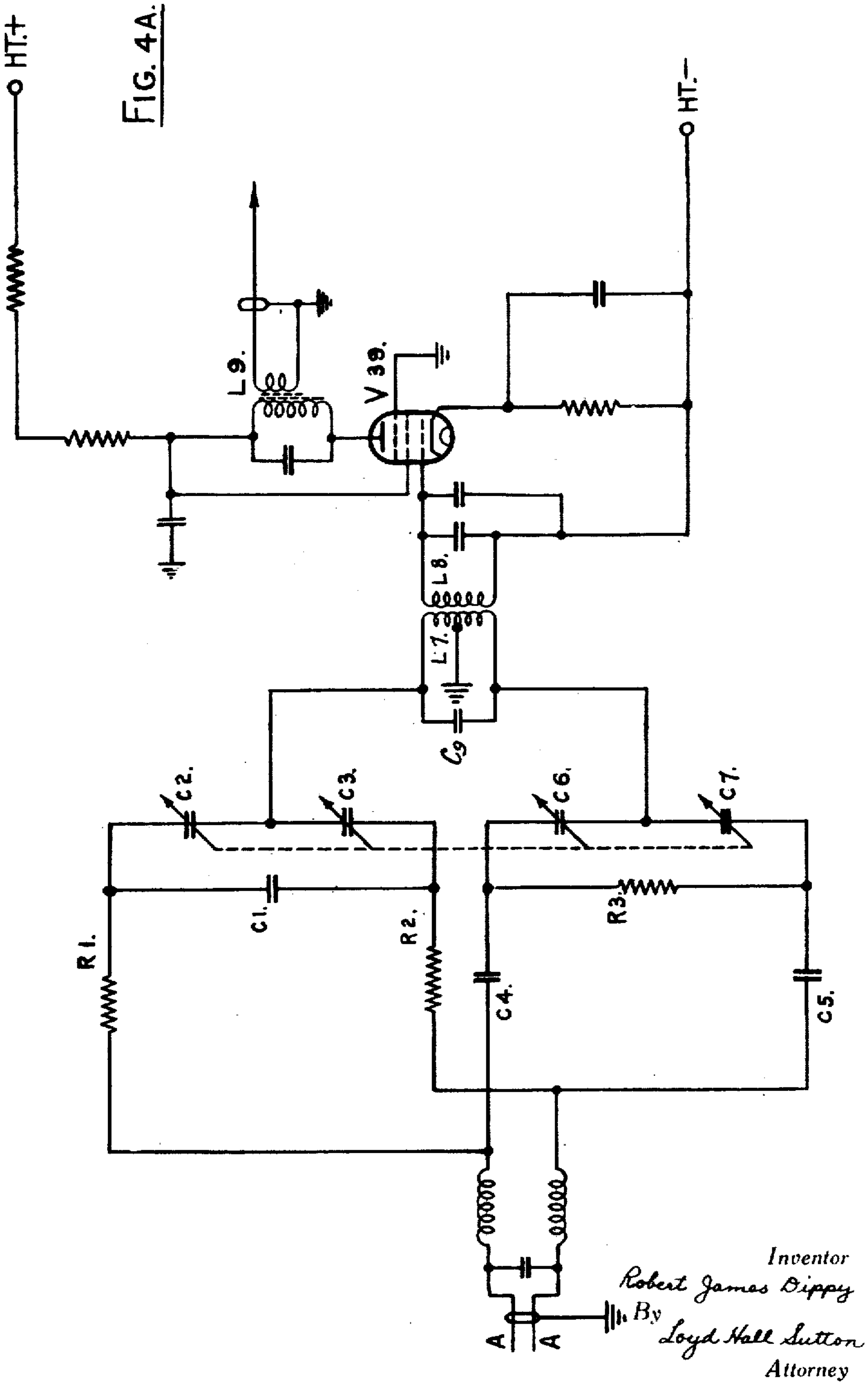

In order that the nature of the invention may be more clearly understood one system embodying the invention will now be described in greater detail by way of example with reference to the accompanying drawings in which:

Figure 1 is a block diagram showing the general arrangement of apparatus at a transmitting and receiving station controlled by signals from another or main transmitter, Figure 2 is a circuit diagram of a part of the main transmitter by which a transmitter may be caused periodically to radiate double pulses, Figure 3 is a circuit diagram of a part of the station shown in Figure 1, Figure 4 shows diagrammatically the manner in which signal indications appear on the luminescent screen of a cathode ray tube under normal operating conditions, Figure 4A illustrates a preferred form of circuit arrangement for effecting fine phase adjustment within the apparatus, e. g., for fine adjustment of the phase of the retransmitted signals with respect to the signals received from the main station.

Figure 5:
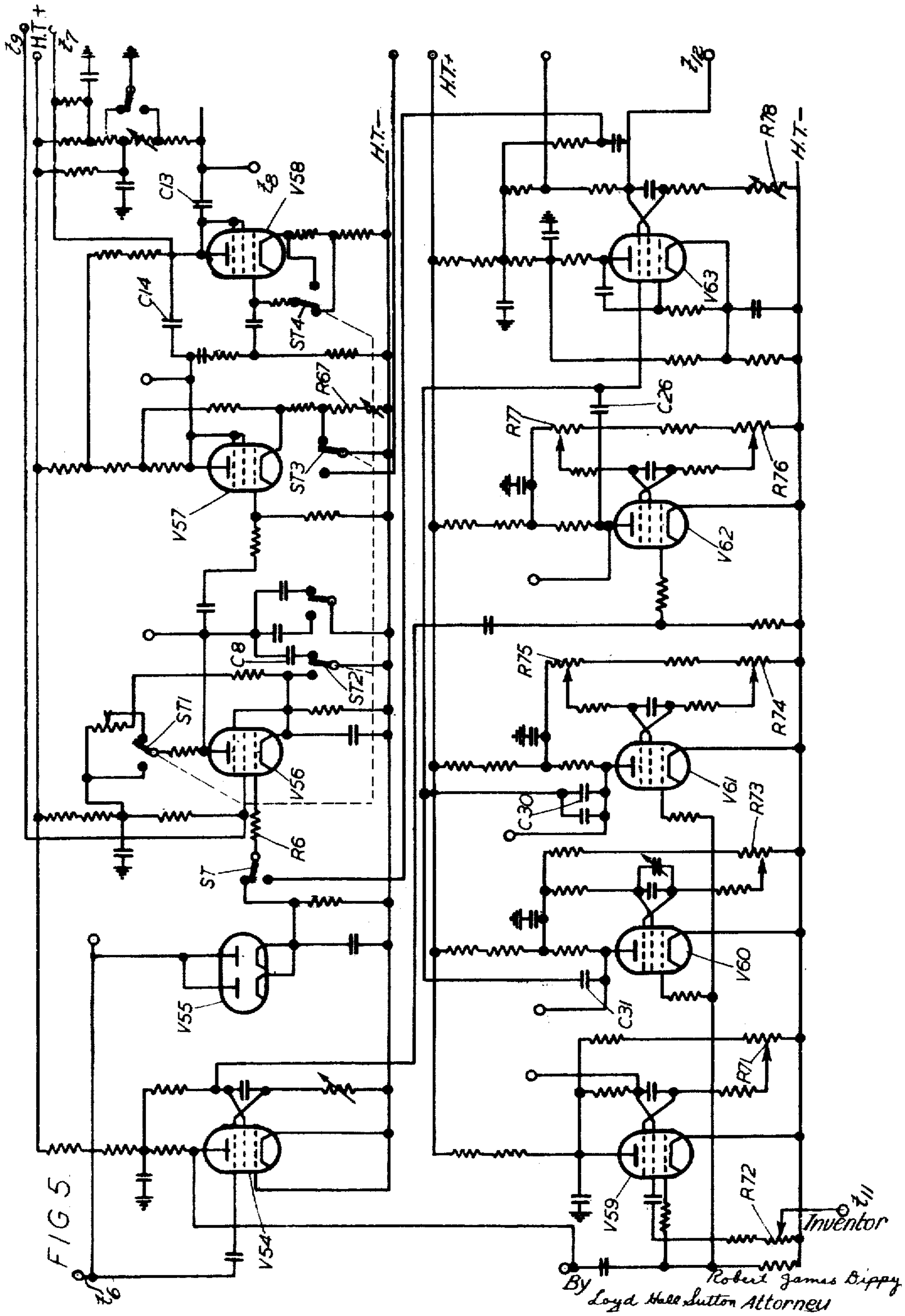

Figure 5 is a detailed circuit diagram of a further portion of the apparatus shown in Figure 1.

One embodiment of the invention, particularly applicable for use in navigational systems as described and claimed in my copending application Serial No. 527,018 comprises a main transmitter, which will be designated "A," radiating a carrier wave of say 6.5 meters, pulse modulated at a repetition frequency of 500 per second. These pulse signals are recived at a distant satellite station which will be designated "B" and are used at that station to develop pulses for modulating a carrier wave of the same wave length as that radiated by the "A" transmitter but having a repetition frequency of 250 per second, the modulating pulses at the "B" transmitter being timed to occur at a selected time-interval after alternate pulses of those radiated by the "A" transmitter.

A third satellite transmitter which will be designated "C" may also utilize the signals received from "A" transmitter in a similar manner to station "B" to control the radiation of a similar pulse modulated carrier wave. The lower repetition frequency of the "B" and "C" stations assists in distinguishing the "B" and "C" transmitter signals from the "A" transmitter signals and also facilitates presentation on the time bases of cathode ray tubes used for monitoring purposes or in co-operating receivers. In order further to assist in distinguishing the pulses from each other, certain ones of those coming from one of the stations, for instance, station "A" may be made of double pulse form. Such double "A" transmitter pulse will normally be arranged always to precede the pulses from a particular controlled station such as station "C."

Referring now to Fig. 1 of the drawings the main transmitter "A" includes a crystal-controlled master oscillator 14 which is stabilised at a frequency of 150 kc./s. for controlling its pulse-recurrence frequency and serves to coordinate the timing of the "B" transmitter and any other co-operating transmitters. This oscillator, through suitable frequency dividing circuits 15, provides a pulse-form control voltage at 500 C. P. S. for application to the main modulating and transmitting circuits 16 whereby short pulses at constant time intervals of 1/500 of a second are radiated from the associated transmitting aerial AT1.

At the satellite transmitter "B" pulses from the "A" transmitter together with the locally radiated "B" transmitter pulses and also other pulses such as from station "C" are picked up by a receiving aerial BR and are passed to a receiver 1 of any suitable, e. g., superheterodyne, type which provides an amplified and rectified output to a pulse shaping and selecting unit 2 where elimination of all but the incoming "A" transmitter pulses is effected in a manner described in detail later. The surviving "A" transmitter pulses are then fed to a unit 3 where they are used to effect locking of a crystal oscillator which is stabilized at a frequency of 150 kc./s., i. e., the same frequency as that used in station "A." The 150 kc./s. output from this oscillator is fed to two parallel channels, 4, 5 each of which contains substantially identical phase-adjusting means and frequency-dividing circuits.

The channel 5 includes a fine phase adjusting unit 6 and a frequency-dividing unit 7 which also includes coarse phase adjusting means. The phase adjusting arrangements of this branch operate, in a manner described in greater detail later, to interpose an adjustable time-interval between the receipt of an "A" transmitter pulse and the radiation of a counterpart "B" transmitter pulse. The frequency-dividing unit 7 provides a suitably phased pulse waveform output at 250 C. P. S. which is fed to the modulator circuits of the "B" transmitter 8 whereby the latter supplies a correspondingly pulse-modulated carrier-wave to the transmitting aerial BT. The transmitter may be of any known type suitable for pulse transmission at high peak power level.

To facilitate adjustment and monitoring of the selected time-interval between received "A" and transmitted counterpart "B" transmitter pulses, a cathode-ray indicator tube T is provided. A portion of the output from receiver 1, which includes both "A" and "B" and also any other transmitter pulses such as those from a "C" station, is fed direct to one vertical deflecting plate Y of the tube T to cause displacement of the tube beam whenever a signal is received.

The second channel 4 supplies the 150 kc./s. output from the oscillator in unit 3 to a fine-phase adjusting unit 9 similar to unit 6 and thence to a frequency divider unit 10 which contains coarse phase-adjusting means and which is similar to unit 7. The phase-adjusting means in this instance serve to provide an adjustable time-relationship between the received "A" transmitter pulses and the timing of the output-waveform from unit 10 which initiates the various time-base and like deflection waveforms for the indicator tube display whereby the said "A" transmitter signals and any other counterparts thereto may be appropriately placed on the time base for observation and time-interval measurement.

The frequency dividing unit 10 provides a suitably phased pulse waveform output at 500 C. P. S. One version of this is supplied to a unit 11 which controls a "gate" valve in the unit 2 for eliminating all but the incoming "A" transmitter pulses in a manner to be described later while a second version of the 500 C. P. S. output from unit 10 is fed to unit 12 which develops therefrom suitable saw-tooth waveforms for supply to the horizontal deflecting plates X of the tube T to effect horizontal scanning, a stepped waveform for supply to the Y plate of the tube T opposite to that supplied with received signals to cause trace displacement at appropriate times and a further pulsed waveform for supply to the grid of the tube T for blacking out the return stroke of each time-base scan. The unit 12 also develops certain further waveforms for the purpose of providing movable "strobes" or markers along the main time-base trace and for initiating additional high-speed scanning voltages in a manner to be described later.

The frequency divider unit 10 also supplies two further waveforms, one consisting of a series of sharp negative-going pulses at a frequency of 150 kc./s. and the other consisting of a similar series of pulses at a frequency of 15 kc./s. The latter is applied to the cathode of the tube T where it causes the formation of a series of bright calibration or time-marker spots along the time-base trace at intervals each equal to 66.7 micro-seconds. The first mentioned waveform is applied, by suitable switching means not shown, to the cathode of the indicator tube T only when the highspeed time bases are in use, when in similar manner to the 15 kc./s. markers, the individual pulses form further bright spots at time intervals each equal to 6.67 micro-seconds, thus subdividing the gaps between the 15 kc./s. markers into 10 equal parts. It is by means of these markers which are locked to the stabilized oscillator frequency and hence to the time-base controlling waveform fed from unit 10 to unit 12, that measurement of the time-interval between the various displayed signals is effected.

The pulse shaping and selector unit 2 (Figure 1) will now be described with reference to Figure 3. Signals from receiver 1 are applied as positive-going pulses to terminal *t*4 and thence through resistance R20 to the control grid of valve V34 which is arranged to effect both amplification and squaring of the signal pulses. The negative-going signal pulses produced at the anode of V34 are applied to the control grid of V35 which is arranged normally to pass anode current and has in its anode circuit a resistance R9 matched to a delay network N which is short-circuited at its far end and designed to produce a 3.5 micro-second square-form impulse across R9 whenever the anode current of V35 is suddenly changed. Each negative-going signal pulse will therefore produce a 3.5 micro-second positive-going square pulse at the anode of V35 irrespective of the duration or amplitude (above a certain minimum) of the input signal. This helps to minimize fading effects of the "A" transmitter signal.

The pulses thus developed are applied to the first grid of a pentode valve V36 which is arranged to act as a "gate" allowing the passage of the "A" transmitter signals but no others. This is achieved by arranging V36 normally to be held cut off at its suppressor grid by the bias voltage across resistors R35, R36 and by applying to said suppressor grid a suitable series of positive-going pulses in timed relation with the "A" transmitter signals whereby the valve anode current is opened up to allow their passage to its anode circuit but is held cut off at all other times. These timed pulses are derived from the 500 C. P. S. output from frequency divider unit 10 which is supplied to the unit 11 (Figure 1).

The unit 11 includes a pentode valve arranged in known manner as a "transitron flip-flop," i. e., having negative mutual conductance between its screen and suppressor grids and with one stable and one unstable limiting conditions of operation. Such valve is arranged to be triggered by the 500 C. P. S. output from unit 10 whereupon thes anode and screen potentials of the valve change to the unstable limiting condition and later revert to the stable limiting condition after a time interval determined by the time-constant of the inter-screen and suppressor grid coupling capacity and an associated adjustable leak resistance. The instant of reversion is used, by suitable differentiation and amplification to provide a narrow positive-going pulse waveform which is applied to the terminal *t*5 to lift the suppressor grid bias of V36 as already described. Adjustment of the above-mentioned leak-resistance permits the timing of these pulses to be synchronized with the arrival of the "A" transmitter pulses at valve V36 whereby the latter appear as negative-going pulses at the anode from which they are fed to amplifier valve V37. The resultant positive-going pulses are passed through terminal OT to the crystal oscillator circuit of unit 3 (Figure 1).

In one form the circuit of unit 3 includes a valve which is normally biassed to cut off but is periodically shock-excited by the applied "A" transmitter pulses from terminal OT (Figure 3) to maintain oscillation in a crystal-controlled circuit coupled to the anode and stabilized at a frequency of 150 kc./s. The output from this crystal-controlled circuit accordingly is of sine wave form and is locked to and sustained by the pulses received from the "A" station. This sine wave output is then passed through a limiter valve to reduce its amplitude to a constant uniform level before being passed to the parallel channels 4 and 5 (Figure 1).

The fine phase-adjusting means of units 6 and 9 (Figure 1) will next be described with reference to Figure 4A. The 150 kc./s. sine wave output from unit 3 (Figure 1) is applied to the input terminals AA to feed two parallel connected networks R1, C1, R2 and C4, R3, C5. Across condenser C1 of the first network is connected a capacity type potentiometer consisting of ganged variable condensers C2 and C3 so arranged that when C2 is at maximum capacity C3 is at minimum. A similar capacity potentiometer comprising variable condensers C6 and C7 is connected across resistance R3 of the second network. The two condenser pairs are themselves ganged together in such manner that if C2 is at maximum capacity and C3 is at minimum then C6 and C7, although mutually 180 degrees displaced, will each be at half-capacity. The complete condenser assembly is arranged to be capable of continuous rotation in either direction. The common point of condensers C2, C3 is connected to one end, and the common point of condensers C6, C7 to the opposite end, of an earthed mid-point primary winding L7 tuned by condenser C9 to the frequency of the input AA. The transformer secondary winding L8 feeds an amplifier valve V39. The output to the frequency dividing and coarse phase-adjusting units 7 or 10 is taken from the anode of V39 by way of transformer L9.

In operation, each complete rotation of the ganged condenser assembly C2, C3, C6, C7 introduces a phase-change (either advancement or retardation according to the direction of rotation) of one cycle between the input at AA and the output from L9. The manner in which this is effected is as follows. By suitable choice of value of condenser C1 and resistors R1 and R2 the alternating voltage across C1 is arranged to be lagging by 45° with respect to the input at AA while by similar means the alternating voltage across R3 of the second network is arranged to be leading by 45°. The input voltages to the respective capacity potentiometers are therefore in quadrature. If now it be assumed that the condenser assembly is so set that C2 is at maximum capacity, C3 will be at minimum and C6, C7 will each be at half capacity. The potentials fed to the top end of L7 will therefore be lagging by 45° with respect to the input AA, the voltages of which are symmetrical about earth potential, while the bottom end of L7 will be at zero, i. e., the same as its centre tap. The resultant will be a 45° lag in the output from L8 to V39. If now the condenser assembly be rotated through 90°, C2 and C3 will be of equal capacity and the alternating voltage fed to the top end of L7 will be zero whilst, if say condenser C6 has become of maximum capacity and C7 accordingly is at minimum the alternating voltage fed to the bottom end of L7 will be 45° phase advanced with respect to the input. Due to the action of the split-primary winding L7 this will be equivalent to 135° phase lag with respect to the first considered condition of the output from L8 to V39, i. e., a phase retardation of 90° has ben effected. By similar consideration it will be seen that rotation of the condenser assembly through a further 90° will introduce a further 90° phase lag and so on proportionately.

The frequency dividing circuits represented at 7 and 10 (Figure 1) each supply an output pulse waveform which is rigidly locked to the 150 kc./s. sine-wave input from units 6 and 9 respectively. The output from unit 7 is at 250 C. P. S. for effecting modulation of the "B" transmitter, while that from unit 10 is at 500 C. P. S. for initiating the time-base and like indicator tube waveforms in unit 12. The frequency dividing circuits employed may be of any convenent form.

The coarse-phase-adjusting means which are included in these units 7 and 10 may also be of any convenient form, such as means whereby the division ratio of one of the dividers may be altered temporarily.

The reason for and use of the various phase-adjusting means is as follows. Since the oscillator in unit 3 is locked by the incoming "A" transmitter pulses, one can regard one particular cycle in every 300 of the oscillator output as associated with an "A" transmitter pulse. The divider stages, on the other hand, in effect, merely count off the 150 kc./s. input sine-wave into batches of 300 or 600 as the case may be without regard to the particular cycles associated with the incoming "A" transmitter pulses. In order that the individual pulses of the outputs from units 7 and 10 may occur at the requisite instants with respect to the incoming "A" transmitter pulses for modulating the "B" transmitter with the required time-delay and for initiating the time-base and other waveforms controlling the indicator tube display whereby the "A" transmitter signals are displayed in the appropriate position thereon, it is necessary to provide means whereby the number of intervening cycles of the 150 kc./s. input frequency between the particular cycle associated with the incoming "A" transmitter pulse and the particular one associated with the output pulse may be varied to obtain the precise relationship required. Adjustment could be effected by appropriate continued rotation of the multiple condenser assembly of unit 6 or 9 but this would be laborious if a large adjustment was required. In practice such condenser is reserved for making fine adjustments over one or two cycles and for fractional settings over one cycle and major alterations effected by the coarse-phase adjusting means, which by a process equivalent to the slipping or missing of a specified number of the 150 kc./s. input oscillations per second effect a rapid change in the relationship between incoming "A" transmitter pulses and the pulse of the output waveworm whilst kept in operation.

The unit 12 (Figure 1) will now be described with reference to Figure 5 of the drawings. The phase-adjusted waveform from unit 10 in the form of positive-going pulses at a frequency of 500 per second is applied through terminal t6 to a diode V55 which, by reason of its cathode load network effects widening of each pulse. These widened pulses are then fed by way of switch ST and resistor R6 to the control grid of a pentode valve V56 which is arranged in known manner as a saw-tooth waveform generator developing its output waveform across condenser C8. This output waveform is then applied to valves V57 and V58 arranged in known manner as a paraphrase push-pull amplifier so as to provide two saw-tooth waveform outputs at 500 C. P. S., each of equal amplitude but in antiphase to one another, for application by way of condensers C13, C14 and terminals t7, t8 to the horizontal deflecting plates XX of the indicator tube T (Figure 1).

The 500 C. P. S. waveform from terminal t6 is also applied to the suppressor grid of a pentode valve V54 which is arranged as a "transitron" relaxation oscillator running at 250 C. P. S. The input positive-going pulses effect locking of this valve whereby it delivers 250 C. P. S. squarewave outputs at both its screen grid and anode.

The anode output waveform is supplied to the control grids of each of the valves V59, V60 and V61 while the screen-grid waveform of valve V54, which is in anti-phase to that from the anode, is fed to the control grid of the valve V62.

Valve V59 is an pentode arranged as a "transitron flip-flop" and operates in substantially identical manner to the valve V7 to Figure 4 of my copending application Serial No. 527,018 to deliver from its screen-grid a three-step negative-going waveform which is fed, to an extent controllable by potentiometer R72, through terminal *t*11 to the vertical deflecting plate Y of the indicator tube T (Figure 1) opposite to that supplied with the received signals. The first step, which occurs at the beginning of the positive-going half of each cycle of the input 250 C. P. S. waveform from valve V54 and is controllable by potentiometer R71, causes upward displacement of one of the 500 C. P. S. time-base scans provided by valves V57, V58 to form the step *a* (Figure 4). The second step of the waveform *t*11 lowers the remainder of the same 500 C. P. S. time-base scan as shown at *b* (Figure 4) while the third step of the waveform which coincides with the whole of the negative-going half-cycle of the input of 250 C. P. S. waveform from V54 causes the next complete 500 C. P. S. scan to be lowered to the level *c* (Figure 4).

The valves V60, V61 and V62 are also pentodes arranged as "transitron flip-flop" oscillators and operate, in substantially identical manner to the valves V8, V9 and V10 of Figure 4 of my copending application Serial No. 527,018, to deliver by way of condensers C31, C30 and C26 to the suppressor grid of valve V63, three negative-going pulse waveforms, the instants of the negative-going fronts of which are separately adjustable by settings of potentiometers R73, R74 and R76 respectively.

The valve V63, which is a further "transitron flip-flop" oscillator, operates in substantially identical manner to valve V11 of Figure 4 of my copending application Serial No. 527,018 and provides at its screen grid a three pulse negative-going waveform repeated 250 times per second, the said pulses corresponding respectively in timing with the negative-going fronts of the pulses supplied by valves V60, V61 and V62 and each pulse having a duration controlled by the setting of potentiometer R78.

This output waveform from V63 is supplied by way of terminal *t*12 to the cathode of the indicator tube T (Figure 1) where it causes brightening of short portions of the main trace (shown in Figure 4) at positions therealong which can be adjusted by the potentiometers R73, R74 and R76, those portions or "strobes" controlled by R73 and R74 and hereinafter referred to as the "A" and "B" transmitter strobes respectively occurring upon the upper trace and the remaining "strobe" hereinafter called the "C" transmitter strobe controlled by R76 occurring on the lower trace.

The same output waveform from V63 is also applied to switch ST where, by suitable operation, it may be fed to the saw-tooth generator valve V56 instead of the 500 C. P. S. pulse waveform from terminal *t*6. Further switches ST1, ST2, ST3 and ST4 are ganged to switch ST in such manner that when the said waveform from V63 is applied to valve V56, the requisite circuit alterations are made within the saw-tooth waveform generator and amplifier to provide separate saw-tooth waves of appropriate amplitudes for the duration of each pulse of the input waveform. The resultant deflections of the beam of the indicator tube T will provide high speed time bases corresponding to the portions of the main-trace selected by the positioning of the aforesaid "strobes." Since the received signals and appropriate time-markers are still being supplied to the indicator tube T and the valve V59 is still supplying its stepped output waveform to its deflector plate Y vertical separation of these high-speed scans will be effected to give simultaneous presentation of the three "strobe" selected portions of the main trace but to a greatly magnified time scale.

In the operation of setting up the "B" station to radiate counterpart pulses at a predetermined time interval after the receipt of pulses from station "A," the fine and coarse phase adjusting means of units 9 and 10 in channel 4 (Figure 1) are first adjusted to bring the relevant "A" signal (i. e., the single pulse "A" transmitter signal in the case where a double pulse "A" transmitter signal is known to be the one associated with a "C" station) on to the top step of the upper trace of the main-time base display as in Figure 4. This will automatically locate the alternate "A" transmitter signals and those, if any, from a "C" station on the lowermost trace and the "B" transmitter pulse, if being radiated will appear somewhere along the lower portion of the upper trace. The "A" transmitter strobe is next adjusted to "straddle" the "A" transmitter signal appearing upon the top step by control of potentiometer R73 (Figure 5) and then by changing switch ST to the high-speed time-base position, the "A" transmitter signal is readjusted by the fine phase control to coincide precisely with a convenient 15 kc./s. time-marker which is taken as zero for all subsequent measurements.

The location of the "A" transmitter signal upon the top step automatically brings it into approximately the correct timing relationship with the pulses fed to the gate valve V36 in unit 2 (Figure 1). Precise coincidence can be effected by temporarily replacing the receiver-output signal to the indicator tube T with the said gate-valve releasing pulse waveform by switching means not shown on the drawings and then making adjustment of control means in unit 11 to bring the "gate" valve pulse into register with the chosen "zero marker." When this is done, only the incoming "A" transmitter pulses will reach the oscillator in unit 3 and correct locking will be achieved.

The receiver-output is now reinstated on the indicator tube T and the "B" transmitter signal now radiated. The coarse and fine phase controls in units 6 and 7 of channel 5 are now adjusted to bring the "B" transmitter pulse when displayed upon the main time base into approximately the correct position corresponding to the required time-delay as indicated by the 15 kc./s. time-markers visible.

The "B" transmitter "strobe" is then moved by adjustment of potentiometer R74 (Figure 5) until it straddles the "B" transmitter signal. Switch ST is then operated to present the high-speed time-bases and final adjustment of the fine-phase control unit 6 made to bring the "B" transmitter signal to the precise reading required using the 150 kc./s. time-markers now visible.

Similar measurement of the time-relationship of the "C" transmitter signsls to the "A" transmitter signals can of course be made, using the "C" transmitter strobe marker adjusted by means of potentiometer R76 (Figure 5) and the associated high-speed trace for obtaining an accurate reading. No adjustment can, of course, be effected to the "C" transmitter timing relationship since the "C" station is distant.

A suitable circuit arrangement for so controlling a transmitter, for instance the "A" transmitter of a system as previously described, that double pulses are radiated periodically for the purpose of assisting identification is shown in Figure 2.

In this circuit a pulse waveform output at the normal pulse recurrence frequency, e. g., 500 C. P. S. in the case of an "A" station is provided by suitable frequency division from the stabilized control oscillator and is applied through terminal *t*1 to a diode V13 which in combination with a second diode V14 serves to eliminate any positive-going portions of the waveform and to provide a series of widened negative-going pulses to the control grid of a pentode valve V15.

A further pulse waveform at a frequency of 125 C. P. S., derived by further subdivision of the stabilized oscillator output is fed by way of terminal *t*2 to the cathode of a diode V17 and the negative-going output pulses therefrom are passed to the control grid of a valve V18. V18 is arranged to effect squaring of the applied pulses and accordingly delivers positive-going square pulses at its anode which are fed to a further diode V19 having a cathode load network of variable time-constant comprising condenser C10 in parallel with resistors R8 and R10, the latter being adjustable. The voltage waveform across C10 for each pulse arriving through the diode V19 will be a rapid rise at the cathode of V19 followed by an exponential decay determined by the setting of R10. This waveform is fed to the control grid of V20 which is normally held cut off by the potential drop across the common bias resistor R12 of that valve and following valve V21. In consequence valve V20 will commence to pass current at the beginning of the voltage waveform from C10 and will cease doing so again at a time which is dependent upon the rate of decay of the voltage across C10 and therefore, dependent upon the setting of R10. V20 is overdriven by the input waveform and accordingly produces a squared pulse at its anode the length of which depends upon setting of R10. This negative-going pulse is passed through a differentiating network C12, R13 to the grid of valve V21. This valve is also normally held cut off with the result that the first negative-going swing of the differentiated waveform has no effect but the following positive-going swing, coincident with the adjustable trailing edge of the pulse from V20, opens up this valve V21 and, due again to overdriving, causes the production of a squared negative-going pulse at its anode. This is fed through buffer diode V22 to the control grid of V15 to form a parallel input to the 500 C. P. S. waveform delivered to it from V14.

V15 is therefore supplied with pulses at 500 C. P. S. and with an additional pulse occurring after every fourth 500 C. P. S. pulse with a delay period thereafter determined by the setting of R10. V15 operates to effect further squaring of the applied pulses which are then fed through a cathode follower valve V16 to terminal *t3* which is connected to the modulating circuits of the transmitter.

The resultant appearance on the screen of an indicator tube such as that T of Figure 1 is a single "A" transmitter pulse on one trace of the main time base and a double pulse on the other trace, the second element of this double pulse being of fainter or "ghost" form due to the fact that it appears only on alternate scans of the particular trace.

A series of circuits similar to those shown diagrammatically in Fig. 1 is used at the "C" station to lock the repetition frequency of that station to the master frequency control unit of the "A" station, and to interpose a desired phasing or time-interval between the "A" and "C" transmitter pulses. In order to provide a pulsed radiation-field with an optimum distribution of time-interval over a particular selected area, further satellite stations similar to "B" and "C" can be installed at favourable positions relatively to the master station "A," and can be brought into operation and co-ordinated with it in the manner already described. To ensure secrecy. The relative phasing of the pulses radiated by the main and satellite stations can be altered, at given times, according to a predetermined code known only to the navigators under guidance.

A separate monitor station, equipped with receiving and timing circuits identical with those used at a satellite station, is preferably used to supervise the operation of the system, although one of the satellite stations can, if necessary, be used for this purpose.

I claim:

1. A wireless transmission system comprising a first transmitter located at a known fixed position, at least two further transmitters also located at known fixed positions in spaced relationship to said first transmitter, separate means for modulating the carrier wave of each of said transmitters whereby they each radiate a succession of pulses of short time duration materially less than that of the intervals separating them and means for controlling the modulating means of each of said further transmitters by the modulation of said first transmitter to maintain a predetermined and constant valued timing relationship between the pulses from said first transmitter and the pulses from each of said further transmitters.

2. A wireless transmission system comprising a first transmitter located at a known fixed position and arranged to radiate a succession of short pulses with a constant time-interval between pulses, at least two further satellite transmitters also located at known fixed positions in spaced relationship to said first transmitter and capable of radiating short pulse signals and means for controlling each satellite transmitter whereby it radiates a counterpart pulse to each of selected pulses transmitted by said first transmitter after a time delay of a chosen constant value greater than the time required for a pulse signal to pass from said first transmitter to said satellite transmitter.

3. A wireless transmission system comprising a first transmitter at a known fixed location, modulation control means for said transmitter, a stable frequency local oscillator, means for deriving a control voltage from said oscillator for application to said modulation control means whereby said transmitter radiates a succession of pulses of short time duration and at constant time-intervals, at least one further transmitter at known fixed location spaced away from said first transmitter, modulation control means for said further transmitter, a stable frequency local oscillator associated with said further transmitter, means for deriving a control voltage from said oscillator for application to the modulation control means of said further transmitter whereby it radiates a succession of pulses of short time duration and at constant intervals, signal receiving means associated with said further transmitter for receiving the pulse signals from said first transmitter and deriving therefrom a corresponding pulse signal output and means for utilising the output from said receiving means to lock the stable frequency local oscillator of said further transmitter whereby the pulse signals radiated by said further transmitter have a predetermined timing relationship with those radiated by said first transmitter.

4. A wireless transmission system according to claim 3 wherein said oscillator locking means comprises a pulse shaping circuit which limits the duration of all incoming pulse signals to a predetermined time duration and includes selective means for excluding all pulse signals except those radiated by said first transmitter from effecting locking of said local oscillator.

5. A wireless transmission system comprising a first transmitter at a known fixed location, modulation control means for said transmitter, a stable frequency local oscillator, means for deriving a control voltage from said oscillator for application to said modulation control means whereby said transmitter radiates a succession of pulses of short time duration and at constant time-intervals, at least one further transmitter at known fixed location spaced away from said first transmitter, modulation control means for said further transmitter, a stable frequency local oscillator associated with said further transmitter, means for deriving a control voltage from said oscillator for application to the modulation control means of said further transmitter whereby it radiates a succession of pulses of short time duration and at constant time-intervals, wireless receiving means associated with said further transmitter for receiving the pulse signals from said first transmitter and deriving therefrom a corresponding pulse signal output, selection means comprising a control valve conditioned to pass current only when the incoming signal pulses from said first transmitter coincide with a timed control voltage derived from the stable frequency local oscillator associated with said further transmitter and means for utilising the output from said selection means to lock the stable frequency local oscillator of said further transmitter whereby the pulse signals radiated thereby have a predetermined timing relationship with those radiated by said first transmitter.

6. A wireless transmission system according to claim 5 wherein the stable frequency local oscillators of said first transmitter and said further transmitters operate at a common frequency.

7. A wireless transmission system comprising a first transmitter, a stable frequency local oscillator, means for deriving a control voltage from said local oscillator for application to said first transmitter whereby it radiates a succession of short pulses at constant time-intervals, two further transmitters located in spaced relationship to said first transmitter and to each other, a further local oscillator at each of said further transmitters, means for deriving control voltages from each further local oscillator for application to their respective transmitters whereby the latter radiate short pulse signals at constant time-intervals twice as long as those of said first transmitter, wireless receiving means at each of said further transmitters for receiving the pulse signals from said first transmitter and means for deriving a control voltage from said wireless receiving means for locking each further local oscillator by the pulse signals received from said first transmitter whereby each of said further transmitters alternately radiates pulses which form counterpart signals to alternate pulses radiated by said first transmitters and having a constant predetermined timing relationship therewith.

8. A wireless transmission system according to claim 7 having means for modifying the pulse signals radiated by at least one of said transmitters to a characteristic and distinctive form.

9. A wireless transmission system comprising a first transmitter arranged to radiate a succession of short pulses with a constant time-interval between pulses, two further transmitters located in spaced relationship to said first transmitter and to each other and each capable of radiating a succession of short pulses at the same radio frequency as said first transmitter, wireless receiving means associated with each of said further transmitters for receiving the pulse signals from said first transmitter and deriving therefrom corresponding pulse signal outputs, means at each of said further transmitters for utilising the associated receiver output to control the modulation of the associated further transmitter whereby it radiates a counterpart pulse to alternate pulses from said first transmitter and means at each of said further transmitters for adjusting the time-interval between reception of a first transmitter pulse and the radiation of a related counterpart pulse thereto to a constant chosen value.

10. A wireless transmission system comprising a first transmitter, a stable frequency oscillator, means for deriving a control voltage from said local oscillator for application to said first transmitter whereby it radiates a succession of short pulses at constant time-intervals, two further transmitters located in spaced relationship to said first transmitter and to each other, a further local oscillator at each of said further transmitters, means for deriving control voltages from each further local oscillator for application to the respective transmitter whereby the latter radiates short pulsed signals at the same radio frequency as said first transmitter and at constant time-intervals twice as long as those of said first transmitter, wireless receiving means at each of said further transmitters for reciving the pulse signals from the said first transmitter and means for deriving a control voltage from the output from each of said wireless receiving means for locking the associated further local oscillator by the pulse signals from said first transmitter whereby each of said further transmitters alternately radiates pulses which form counterpart signals to alternate pulses radiated by said first transmitter after a constant predetermined time delay and means at each of said further transmitters for adjusting the time delay between the received first transmitter signal and the radiated counterpart signal to a selected value.

11. A wireless navigation system comprising three radio transmitters at known fixed locations and spaced from each other, means for transmitting from each of said transmitters radio pulses at a regular repetition rate with the pulses of short duration compared with the repetition period, means for operating two of said transmitters as a pair with the radio pulses from one transmitter of said pair having a definite known time relation to the radio pulses from the other transmitter of said pair, and means for operating one of the transmitters of said first pair and the third transmitter as a second pair with the radio pulses from one transmitter of said second pair having a definite known time relation to the radio pulses from the other transmitter of said second pair.

12. A wireless navigation system according to claim 11 wherein the radio transmitter which is common to said first and second pairs of transmitters comprises means for transmitting therefrom radio pulses at a repetition frequency that is twice the repetition frequency of the pulses transmitted from each of the two other transmitters.

References Cited in the file of this patent

UNITED STATES PATENTS 2,689,346 Pierce et al. ____________ Sept. 14, 1954

UNITED STATES PATENT OFFICE

CERTIFICATE OF CORRECTION

Patent No. 2,800,652 July 23, 1957

Robert James Dippy

It is hereby certified that error appears in the printed specification of the above numbered patent requiring correction and that the said Letters Patent should read as corrected below.

Column 1, line 30, after "wave" insert a comma; column 2, line 50, for "recived" read -- received --; column 4, line 66, for "thes" read -- the --; column 6, line 12, for "convenent" read -- convenient --; column 8, line 52, for "signsls" read -- signals --; column 9, line 59, for "secrecy. The" read -- secrecy, the --; column 12, line 15, for "reciving" read -- receiving --; column 12, list of references cited, under the heading "UNITED STATES PATENTS" insert the following references:

| | | |
|---|---|---|
| 2,134,716 | Gunn- - - - - - - - | Nov. 1, 1938 |
| 2,144,203 | Shanklin - - - - - | Jan. 17, 1939 |
| 2,256,336 | Beatty - - - - - - | Sept. 16, 1941 |
| 2,328,944 | Beatty - - - - - - | Sept. 7, 1943 |
| 2,403,626 | Wolff et al - - - | July 9, 1946 |
| 2,407,287 | Labin - - - - - - | Sept. 10, 1946 |

Signed and sealed this 1st day of October 1957.

(SEAL)
Attest:
KARL H. AXLINE
Attesting Officer

ROBERT C. WATSON
Commissioner of Patents